(12) United States Patent
Leung et al.

(10) Patent No.: US 9,203,753 B2
(45) Date of Patent: Dec. 1, 2015

(54) TRAFFIC OPTIMIZATION USING NETWORK ADDRESS AND PORT TRANSLATION IN A COMPUTER CLUSTER

(71) Applicant: Cisco Technology, Inc., San Jose, CA (US)

(72) Inventors: Kent Leung, Palo Alto, CA (US); Hy Quoc Pham, Fremont, CA (US); Jayaraman Iyer, San Jose, CA (US); Xun Wang, Milpitas, CA (US); Andrew E. Ossipov, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 14/089,006

(22) Filed: Nov. 25, 2013

(65) Prior Publication Data

US 2015/0146724 A1 May 28, 2015

(51) Int. Cl.
*H04L 12/741* (2013.01)
*H04L 29/08* (2006.01)

(52) U.S. Cl.
CPC .............. *H04L 45/745* (2013.01); *H04L 45/54* (2013.01); *H04L 67/327* (2013.01)

(58) Field of Classification Search
CPC ........ H04L 45/745; H04L 45/54; H04L 45/72
See application file for complete search history.

(56) References Cited

U.S. PATENT DOCUMENTS

| | | | |
|---|---|---|---|
| 7,953,089 B1 | 5/2011 | Ramakrishnan et al. | |
| 8,218,561 B2 | 7/2012 | Akhter et al. | |
| 2003/0123463 A1* | 7/2003 | Yoshida et al. | 370/401 |
| 2004/0197079 A1* | 10/2004 | Latvala et al. | 386/46 |
| 2008/0177868 A1* | 7/2008 | Zilbershtein et al. | 709/220 |
| 2013/0073743 A1 | 3/2013 | Ramasamy et al. | |
| 2013/0136126 A1* | 5/2013 | Wang et al. | 370/392 |

* cited by examiner

*Primary Examiner* — Mohammad Anwar
(74) *Attorney, Agent, or Firm* — Edell, Shapiro & Finnan, LLC (57) ABSTRACT

Techniques are presented herein for optimizing and load balancing network traffic exchanged between devices in a network environment. At a first device in a cluster of devices in a network, a packet is received from a second device in the cluster. The packet comprises identifier information that is assigned to the first device. The identifier information is reassigned to the second device in the cluster such that subsequent packets with the identifier information are sent directly to the second device. A mapping table is updated to indicate that the identifier information is reassigned to the second device.

24 Claims, 10 Drawing Sheets

TRAFFIC OPTIMIZATION USING NETWORK ADDRESS AND PORT TRANSLATION IN A COMPUTER CLUSTER

TECHNICAL FIELD

The present disclosure relates to optimizing and load balancing network traffic exchanged between devices in a network environment.

BACKGROUND

In network environments, devices may be configured to exchange communications with each other via one or more switch devices ("switches"). As network traffic scales with many network devices, the topology of the network environment may become more complex, and many switches may be deployed to forward traffic between the network devices. The network devices may be arranged in one or more clusters in order to support high traffic volume, and switches may forward traffic to the clusters. Load balancers are typically deployed in front of the clusters to spread network traffic (e.g., "load") across devices in the cluster. The devices in the cluster may be configured as Network Address Translators (NATs) and/or Port Address Translators (PATs). The switches may forward traffic to devices in a cluster based on identifier information contained in a packet. The identifier information may include address and port information. Traffic for a same communication session may be forwarded to different devices in a cluster based on the traffic direction, resulting in "asymmetric communication."

DESCRIPTION OF EXAMPLE EMBODIMENTS

Overview

Techniques are presented herein for optimizing and load balancing network traffic exchanged between devices in a network environment. A first network device in a cluster of devices in a network receives a packet from a second device in the cluster. The packet comprises identifier information that is assigned to the first device. The identifier information is reassigned to the second device in the cluster such that subsequent packets with the identifier information are directly sent to the second device. A mapping table is updated to indicate that the identifier information is reassigned to the second device.

Example Embodiments

Figure 1A:
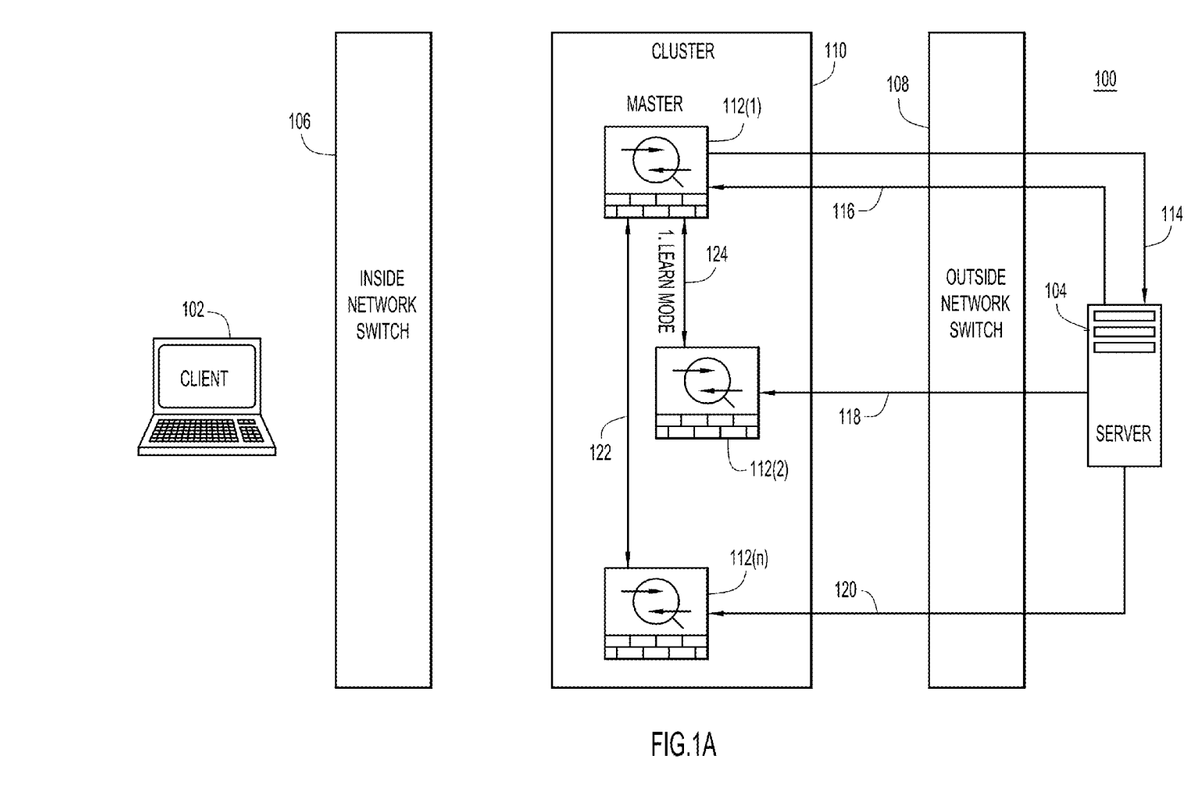
FIGS. 1A-1C show example network topologies that include a cluster of network devices configured to optimize traffic routing between a client device and a server device.

The techniques presented herein involve optimizing network traffic exchanged between devices in a network environment. An example network system/topology (hereinafter "network") is shown at reference numeral 100 in FIG. 1A. The network 100 has a client device (also referred to hereinafter as "client"), shown at reference numeral 102, and a server device (also referred to hereinafter as "server"), shown at reference numeral 104. FIG. 1 also shows a plurality of network switch devices ("network switches") at reference numeral 106 and reference numeral 108. The network switch 106 is also referred to hereinafter as an "inside network switch" and the network switch 108 is also referred to hereinafter as an "outside network switch." In general, the client 102 may reside within a private network (not shown in FIG. 1A), and thus, the classification of the network switch 106 as an "inside network switch" indicates that the network switch 106 resides within the same private network as the client 102. Likewise, the classification of the network switch 108 as an "outside network switch" indicates that the network switch 108 resides outside of the private network in which the client 102 resides.

FIG. 1A also shows, at reference numeral 110, a cluster of network devices ("devices"). The devices in the cluster 110 are shown at reference numeral 112(1)-112(n). It should be appreciated that the cluster 110 may contain other devices (e.g., network appliances, servers, etc.), and in general, the devices in the cluster 110 are referred to herein as "units." For simplicity, the depictions and examples hereinafter describe only devices 112(1)-112(n) in the cluster 110, and thus, in FIG. 1A, the only units that are shown in the cluster 110 are the devices 112(1)-112(n). It should be appreciated that any number of units, including any number of devices, may be present in the cluster 110. It should also be appreciated that, as described herein, the devices 112(1)-112(n) in the cluster 110 reside outside of the private network in which the client 102 resides, and as such, the operation of the devices 112(1)-112(n) is different from the operation of the inside network switch 106. In one example, the operations of the devices depend on a type of network traffic and the source and destination of the traffic. Additionally, the operation of the devices 112(1)-112(n) is different from the operation of the outside network switch 108.

As will become apparent hereinafter, the client 102 and the server 104 communicate with each other. Though not shown in FIG. 1A, the client 102 may reside in a private network, and can exchange communications with the server 104 via the inside network switch 106, one or more of the devices 112(1)-112(n) in the cluster 110 and the outside network switch 108. When the client 102 resides in the private network, one or more of the devices 112(1)-112(n) in the cluster 110 may be configured to perform Network Address Translation (NAT) and/or Port Address Translation (PAT) operations on communications originating from the client 102 in the private network and destined for the server 104 outside of the private network. That is, devices 112(1)-112(n) in the cluster 110 may be configured to map private addresses to public addresses. For example, when the client 102 resides in the private network, the client 102 may be provisioned with a private network address (e.g., a private Internet Protocol (IP) address). Devices outside of the private network (e.g., the server 104) may not be aware of or otherwise have access to the private IP address of the client 102. Instead, the server 104 might only be aware of the public IP address associated with device to which the private IP addresses are mapped. Without any public association that identifies the (particular) client 102, the server 104 may not be able to send communications to the client 102, since the server 104 does not know the private IP address of the client 102. To solve this problem, NAT and PAT techniques may be utilized to create a public association with the private IP address of the client 102. That is, NAT techniques may be utilized by one of the devices 112(1)-112(n) in the cluster 110 to associate the private IP address of the client 102 with a publicly available IP address that is accessible to the server 104, and PAT techniques may be utilized by one of the devices 112(1)-112(n) (e.g., the same device that performs the NAT) to associate the client 102 with a publicly available port that is accessible to the server 104. NAT and PAT techniques are generally described in the Internet Engineering Task Force (IETF) Request for Comments (RFC) publication 2663.

In FIG. 1A, the devices 112(1)-112(n) are configured to send and receive communications (e.g., "packets") to the server 104 via the outside network switch 108. These communications may originate, for example, from the client 102 that is inside a private network. Alternatively, the communications may originate from the devices 112(1)-112(n) themselves. In FIG. 1A, communications originate from device 112(1). Device 112(1) is designated as a master device, which is configured to assign identifier information (e.g., a public IP address and port pair) to a packet. It should be appreciated that though FIG. 1A does not show communications originating from the client 102, for communications that originate from the client 102 inside the private network, the device 112(1) assigns the public IP address and port to a packet as a part of the NAT and PAT techniques. It should also be appreciated that in one example, the device 112(1) may only perform NAT techniques (i.e., assign a public IP address to a packet) and not PAT techniques, and in another example, the device 112(1) may only perform PAT techniques (i.e., assign a public port to a packet). Thus, the identification information may include IP address and port pair identifier information. For simplicity, it is assumed herein that the device 112(1) performs both the NAT and PAT techniques.

In FIG. 1A, as shown at reference numeral 114, the master device 112(1) sends a packet to the server 104 via the outside network switch 108. The packet does not originate from the client 102, and instead originates from the master device 112(1) itself. The session shown in the network 100 in FIG. 1A is said to be in a "learning" or "learn" mode to enable the devices in the cluster 110 to learn the associations of the identifier information (e.g., the public IP address and port pair identifier information and/or Media Access Control (MAC) address information) with particular devices, as will become apparent hereinafter. Specifically, FIG. 1A depicts a bootstrap learning mode, wherein the devices 112(1)-112(n) learn associations of identifier information with particular devices in the cluster 110 by exchanging communications with the server 104 and the outside network switch 108.

The master device 112(1) sends the packet at 114 to the server 104. The server 104 then sends the packet, via the outside network switch 108, back to one of the devices 112(1)-112(n) in the cluster 110. For example, as shown, the server 104 may send the packet to the device 112(1) and 112(2) based on a source IP address and port. A switch outside of the cluster 110 may distribute traffic among devices in the cluster based on the IP address only or on the IP address and port pair.

The packet that is sent by the server 104 to one of the devices 112(1)-112(n) in the cluster 110 contains identifier information. In one embodiment, the identifier information may be generated by a device in the cluster, and the identifier information may indicate the public IP address and the public port which was assigned to the packet by the master device 112(1). In another embodiment, the identifier information indicates the MAC address generated by and associated with the master device 112(1). For example, the master device 112(1) may generate a MAC address (e.g., a virtual MAC address) statically or dynamically for the packet. Virtual MAC addresses may be generated to ensure symmetry on a reverse path through the cluster. It should be appreciated that the examples provided herein may describe the identifier information with an IP address and/or public port and may also describe the identifier information with a MAC address. For simplicity, the techniques herein describe the identifier information as an IP address and/or port pair, though these techniques may be applicable to MAC address identifier information. For example, in the description provided herein, the descriptions of the IP address and/or port pair may be substantially applicable to the MAC address identifier. It should be further appreciated that MAC address identifiers may be effective for third-party interoperability with the network cluster 110, and use of the MAC address identifiers may reduce complexities associated with using an IP address and port pair as the identifier information.

The packet sent by the server 104 to one of the devices 112(1)-112(n) has a destination address that lists the public IP address and the public port assigned to the packet by the master device 112(1). When the server 104 sends the packet, the outside network switch 108 will hash the packet to one of the devices 112(1)-112(n) in the cluster 110. For a given packet flow (e.g., in the example where the client 102 is sending multiple communications to the server 104), the outside network switch 108 will always hash packets that are part of the flow to the same device in the cluster 110. For example, when the server 104 sends the packet to the outside network switch 108, the outside network switch 108 may hash the packet (and all subsequent packets with the same destination IP address and port as this packet) such that the packet is sent to device 112(n), as shown at 120.

Device 112(n) receives the packet from the outside network switch 108. Device 112(n), however, is not the same device in the cluster 110 that associated the packet with the public IP address and the public port (e.g., master device 112(1)). Since device 112(n) is not the master device for the packet, in typical network environments, the packet must be routed or forwarded internally within the cluster 110 from device 112(n) to the master device 112(1). Also, since all subsequent packets in the flow utilizing the IP address and port associated to the packet will be hashed by the outside network switch 108 to the same device in the cluster 110 (device 112(n) in this example), all of the subsequent packets with this identifier information will also have to be routed or forwarded internally within the cluster 110 from device 112(n) to the master device 112(1). As the network 100 scales and as network traffic increases, the internal routing of packets within the cluster 110 may be the source of significant network congestion and packet processing delays. It is operationally desirable for the packets from the server 104 to be hashed by the outside network switch 108 to a device that operates as the master device for those packets. In such a scenario, network congestion would be reduced, since the internal routing of packets within a cluster would be minimized, as packets reaching the cluster from the server 104 and the outside network switch 108 would be hashed to the master device for the packet without any internal routing or forwarding within the cluster 110.

The techniques described herein provide such a solution. In FIG. 1A, device 112(1) is designated as the master device for the packet, and as such, device 112(1) shares with device 112(2) and 112(n) the IP address and port that it previously associated with the packet. Upon device 112(n) receiving the packet, device 112(n) sends the packet to the master device 112(1), as shown at reference 122, based on the mapping information received from device 112(1). That is, device 112(1) sends mapping information that associates the public IP address and port with device 112(1), and as device 112(n) receives the packet with the identifier information indicating the public IP address and port, device 112(n) determines that the public IP address and port are associated with device 112(1). Upon receiving the packet from device 112(n), device 112(1) then sends a message to device 112(n), and to the other devices in the cluster 110 including device 112(2), indicating that device 112(n) is now reassigned as the master for packets that have this public IP address and port pair. In other words, by receiving the packet from device 112(n), device 112(1) knows that the outside network switch 108 has hashed the packet to device 112(n) in the cluster, and thus, device 112(1) reassigns device 112(n) as the new master device for packets with the IP address and port identifier information. When device 112(n) is designated as the new master device, device 112(n) uses the IP address and port identifier information for serving communication sessions. However, device 112(1) is able to determine the source device in the cluster 110 (e.g., device 112(n)), from which the forwarding of the packet originates. FIG. 1A also shows a forwarding route 124 for the scenario when device 112(2), and not device 112(n), receives the packet, originating from the server 104, from the outside switch 108. In this example, device 112(2) behaves similarly to device 112(n).

Figure 1B:
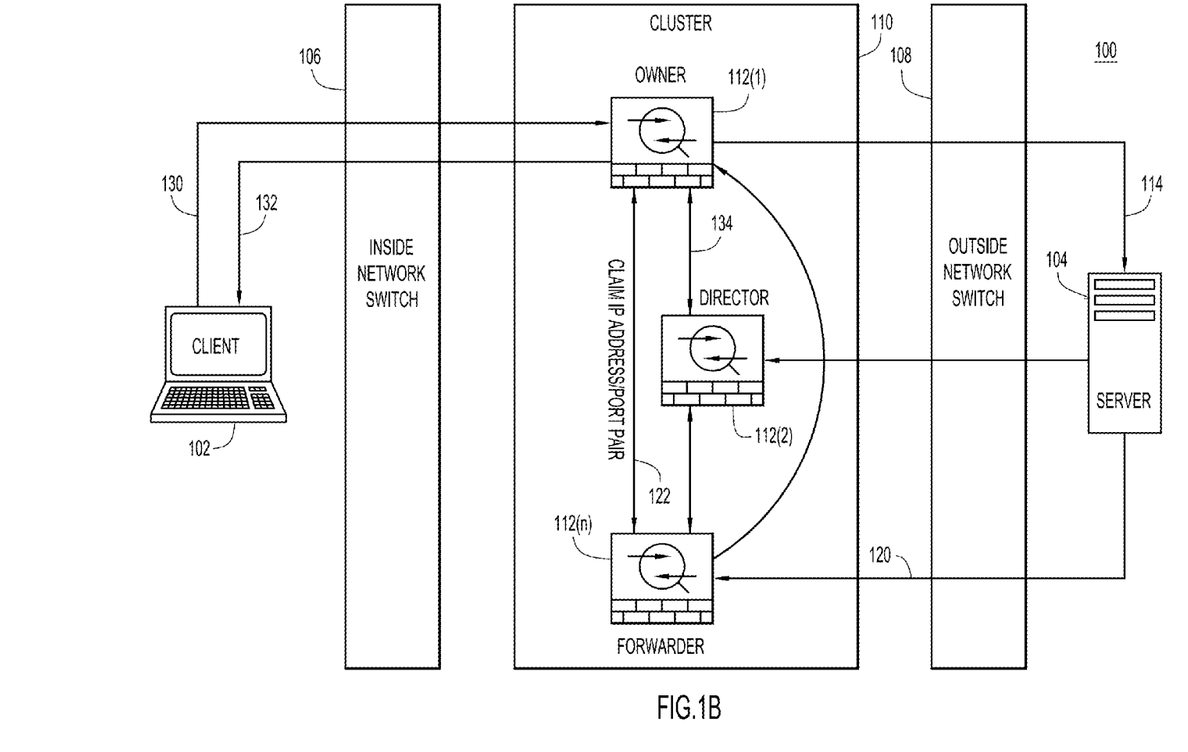

Reference is now made to FIG. 1B. FIG. 1B depicts an operational learning mode, wherein the devices 112(1)-112(n) in the cluster 110 learn the associations of identifier information with particular devices in the cluster 110 through the course of a message exchange between the client 102 and the server 104. In particular, FIG. 1B shows a session in the network 100 in which the client 102, at 130, sends a packet destined for the server 104 via the inside network switch 106. Upon receiving the packet from the client 102, the inside network switch 106 hashes the packet such that the packet is sent to the device 112(1). Similar to the scenario described in connection with FIG. 1A, device 112(1) associates a public IP address and port pair (e.g., "port identifier pair") with the packet. In doing so, the device 112(1) is designated as the master device 112(1) for the public IP address and port, and distributes a mapping table ("map") to the other devices in the cluster 110 (e.g., device 112(2) and device 112(n)). The mapping table contains information that informs the devices that the public IP address and port identifier pair is associated with the master device 112(1).

Similar to the example described in FIG. 1A, the master device 112(1) then sends, at 114, the packet to the server 104 via the outside network switch 108. The server 104 then sends, at 120, a response packet destined for the client 102 via the outside network switch 108. The response packet comprises, for example, the public IP address and port identifier information in its destination address. The outside network switch 108 hashes the packet to the device 112(n). Upon receiving the packet, device 112(n) uses the mapping table distributed by the master device 112(1) and determines that the device 112(1) is associated with the public IP address and port identifier information in the destination address of the packet. The device 112(n) then sends, at 122, the packet to device 112(1). Device 112(1), upon receiving the packet from device 112(n) sends, at 132, the packet to the client 102 via the inside network switch 106. Additionally, the device 112(1) learns that the packet was received in the cluster 110 initially at device 112(n). Thus, as described above in connection with FIG. 1A, device 112(1) reassigns the public IP address and port identifier pair to device 112(n), thus making device 112(n) the master device for the public IP address and port identifier pair. Device 112(1) then updates its mapping table to indicate that device 112(n) is the master device and sends the updated mapping table to all of the devices in the cluster 110. For example, as shown at 134, device 112(1) sends the updated mapping table to device 112(2) in addition to device 112(n). Additionally, upon being designated as the master device 112(n) for the public IP address and port identifier pair, device 112(n) may also send a mapping table to the devices in the cluster 110 identifying it as such. Thus, subsequent packets that are a part of the session are sent directly to device 112(n) from the outside network switch 108, thus reducing the need to internally forward the packets within the cluster 110.

Figure 1C:
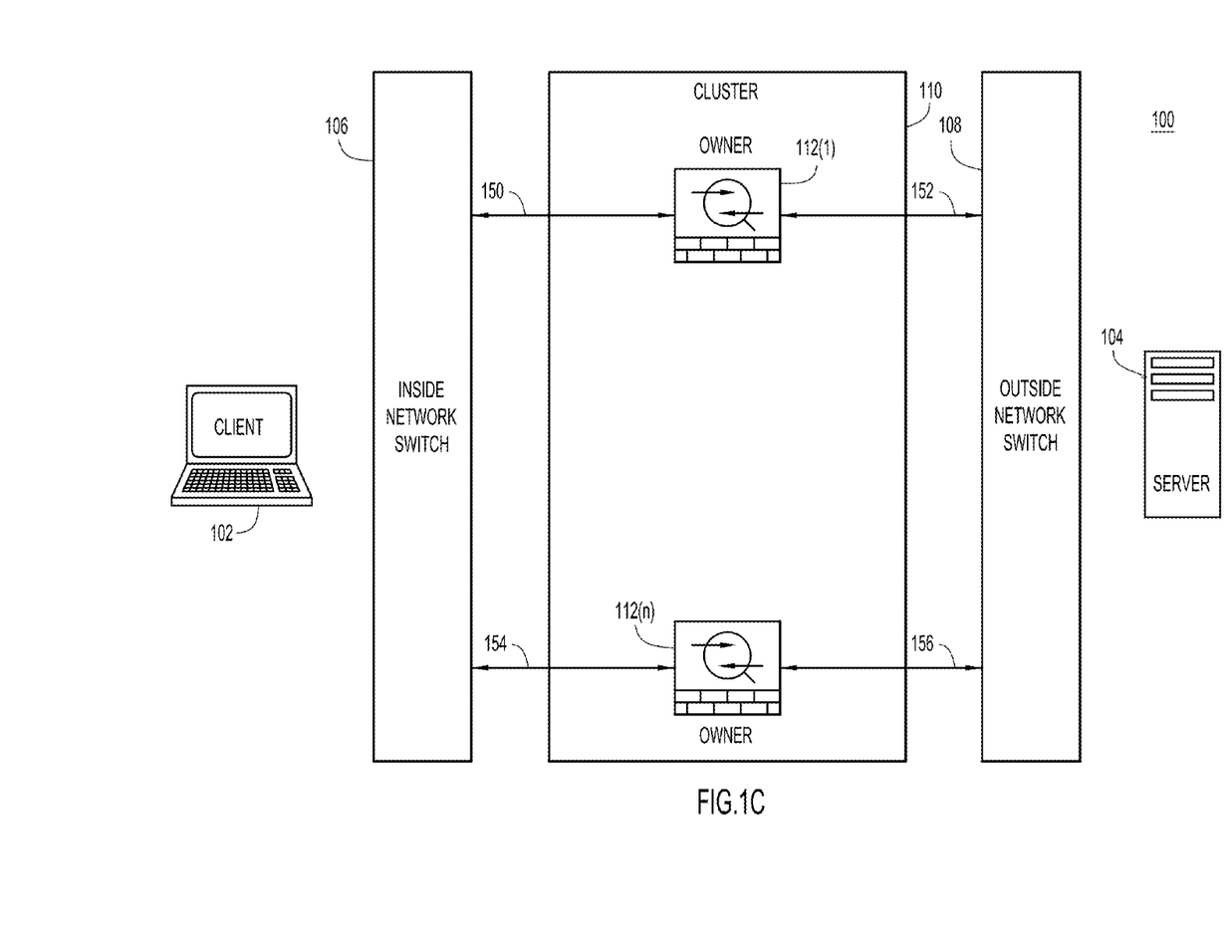

Reference is now made to FIG. 1C. FIG. 1C depicts a software learning mode, wherein the devices 112(1)-112(n) in the cluster are configured to learn the associations of identifier information with particular devices in the cluster 110 by evaluating hashing algorithms of the inside network switch 106 and the outside network switch 108. FIG. 1C shows a session in the network 100 where the devices in the cluster 110 can learn the hashing algorithms of the inside network switch 106 and the outside network switch 108. For example, FIG. 1C shows two of the devices in the cluster 110, device 112(1) and device 112(n). As shown at 150, device 112(1) may be configured to learn the hashing algorithm of the inside network switch 106 (though not necessary), and as shown at 152, device 112(1) is configured to learn the hashing algorithm of the outside network switch 108. Likewise, as shown at 154, device 112(n) may be configured to learn the hashing algorithm of the inside network switch 106, and as shown at 156, device 112(n) is configured to learn the hashing algorithm of the outside network switch 108 When device 112(1) and device 112(n) learn the hashing algorithm of the outside network switch 108, device 112(1) and device 112(n) are able to determine to which device in the cluster 110 the outside network switch 108 will hash packets with the public IP address and port identifier pair. In one example, the device 112(1) and 112(n) learn the hashing algorithm via a software function. For example, the devices may pass the identifier information to a software function, and the software function may generate a result that points to a particular device.

Figure 2:
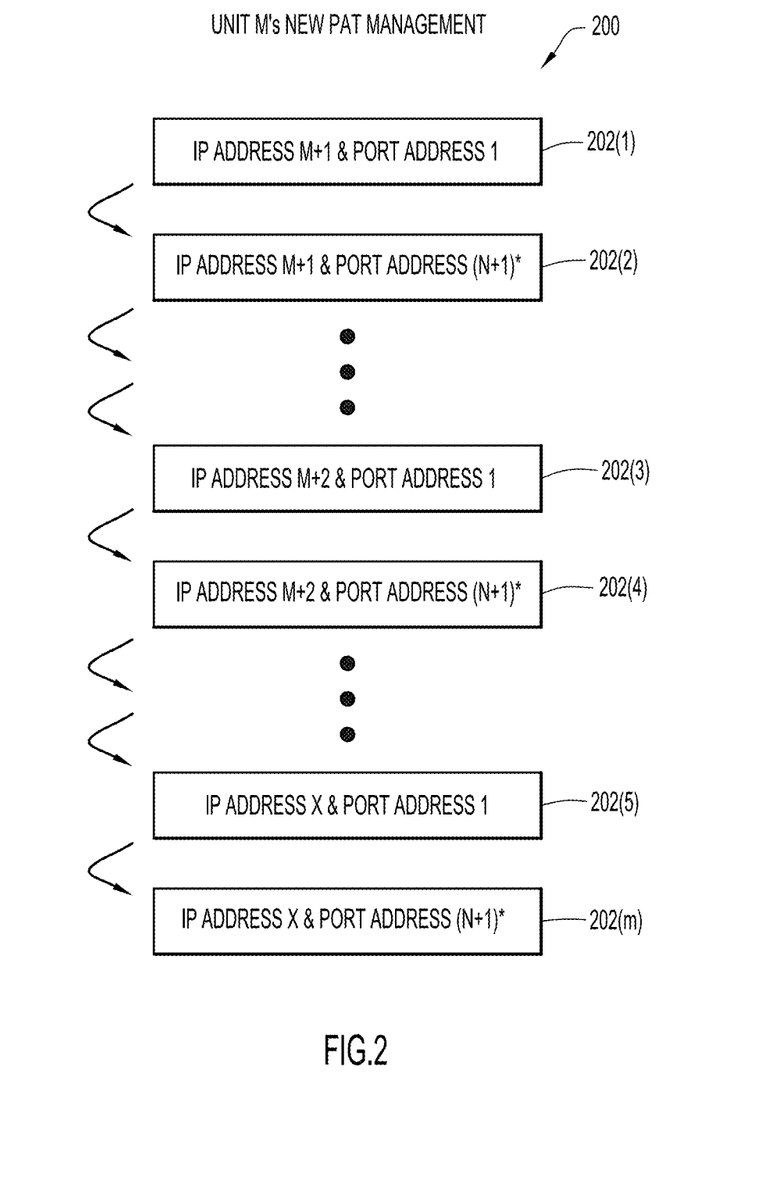
FIG. 2 shows an example mapping table maintained by a network device in the cluster in accordance with the techniques presented herein.

Reference is now made to FIG. 2. FIG. 2 shows an example mapping table 200 maintained by one or more devices in the cluster 110. The mapping table 200 in FIG. 2 shows a plurality of entries 202(1)-202(m) of IP addresses and port identifier (e.g., port address) pairs in the mapping table 200. The IP addresses and port identifiers as a pair are assigned to packets by a device in the cluster 110 as a part of the NAT and PAT processes, described above. In one example, the mapping table 200 updates the list 210 by including both the public IP address and the port address associated with a packet in a single entry.

Figure 3:
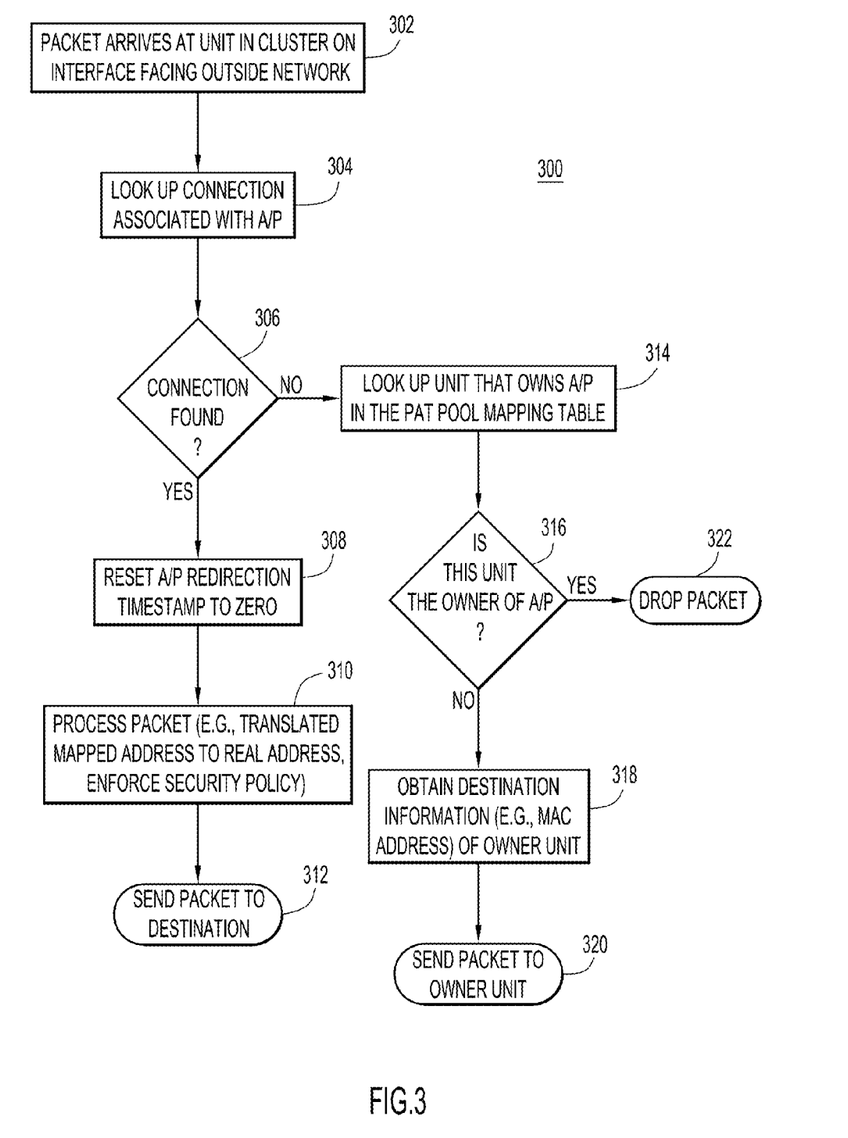
FIG. 3 shows an example flow chart depicting operations for a network device to return traffic to a master network device.

Reference is now made to FIG. 3. FIG. 3 shows an example flow chart 300 depicting operations for a device in the cluster 110 returning traffic to a device (e.g., a "master device") in the cluster 110. At reference numeral 302, a packet arrives at a unit (device) in the cluster 110 on an interface facing the outside network (e.g., facing the outside network switch 108 shown in FIG. 1A). At 304, the device looks up a connection associated with the public IP address and port identifier pair contained in the packet. At 306, the device determines if a connection is found. That is, the device evaluates its mapping table to determine whether or not it is associated with the public IP address and port identifier pair in the packet. If so, the device is the master device for the packet (e.g., the public IP address and port identifier pair is "owned" by the device). At 308, the device resets its address pair redirection timestamp to zero, and at 310 processes the packet (e.g., translates the public IP address to a private IP address associated with the client 102, enforces security policies, etc.). At 312, the packet is sent to its destination (e.g., the client 102).

At 314, when a connection is not found (i.e., when the IP address and port identifier pair is not owned by the device), the device looks up in its mapping table the device in the cluster that owns the IP address and port identifier pair. At operation 316, a determination is made as to whether a unit owns an address/port pair. That is, a unit receiving a packet checks if itself is an owner unit. If not, at 318, destination information is obtained for the owner unit, and at 320, the packet is sent to the owner unit. If the answer to operation 316 is yes (i.e., if the unit is an owner unit), at 322, there is no connection to another owner unit and the packet is dropped.

Figure 4:
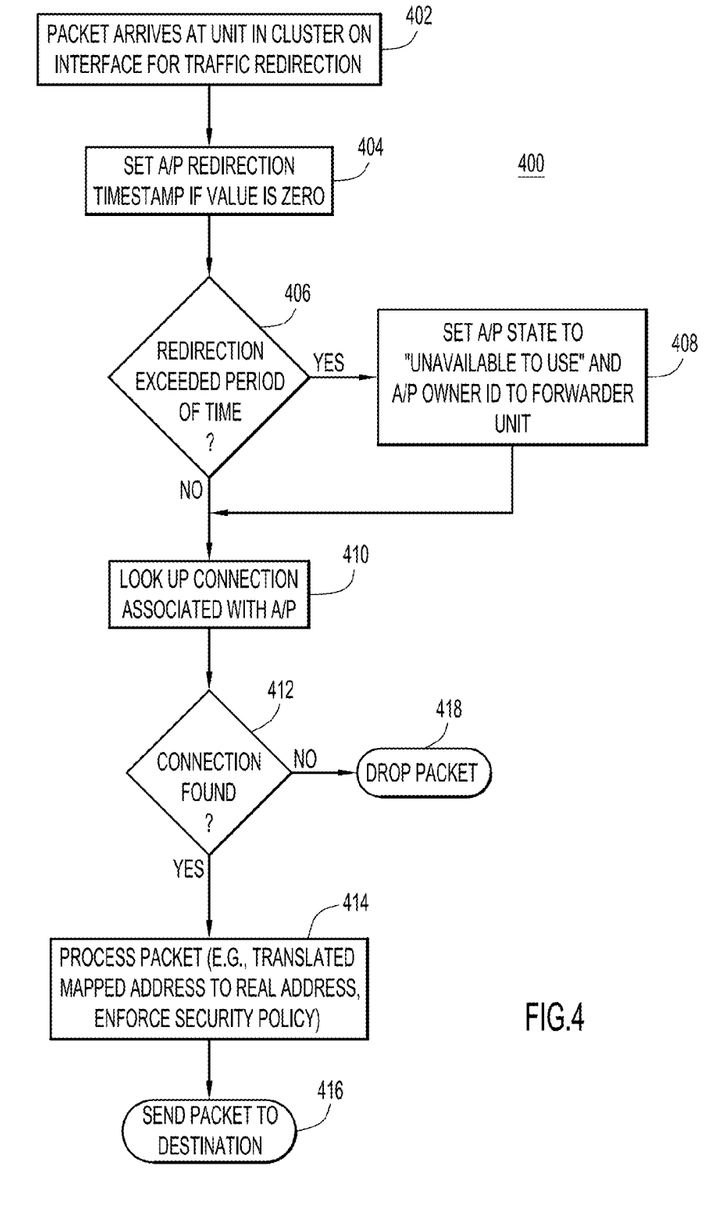
FIG. 4 shows an example flow chart depicting operations for a network device to redirect traffic to the master network device within a redirection time period.

Reference is now made to FIG. 4. FIG. 4 shows an example flow chart 400 depicting operations for a device in the cluster 110 redirecting traffic to the master device in the cluster within a redirection time period. At 402, a packet arrives at a device in the cluster 110 on an interface for traffic redirection. For example, the packet may arrive from another device in the cluster 110. At operation 404, the device sets a redirection timestamp value to zero. The value is reset to zero when the device is the owner of the IP address and port identifier pair. At 406, a determination is made as to whether the redirection exceeded a predetermined period of time. This allows enough time for a transient link or unit failure in the cluster 110 to recover. If so, at 408, the device sets an address port state to "unavailable to use," and an identifier of the device that owns the IP address and port identifier pair is sent to a forwarder device in the cluster 110. Operation 408 indicates that an IP address and port are not available to be used after a NAT and PAT session has ended. If the redirection time has not been exceeded, at operation 410, the device looks up the connection associated with the IP address and port identifier pair. A determination is made, at 412, as to whether the connection is found. If so, the packet is processed at 414 and sent to the destination at 416. If a connection is not found, at 418, the packet is dropped.

Figure 5:
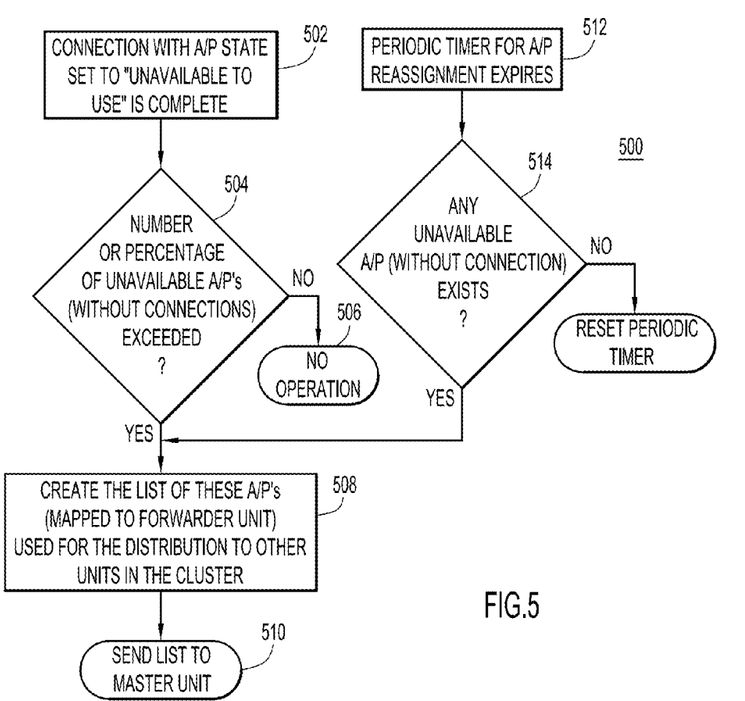
FIG. 5 shows an example flow chart depicting operations for a network device to generate a list of address and port pair information to be distributed to other network devices in the cluster.

Reference is now made to FIG. 5. FIG. 5 shows an example flow chart 500 depicting operations for a device in the cluster 110 generating a list of address and port pair information to be distributed to other devices in the cluster 110. At reference 502, a connection state with an address and port state is set to "unavailable to use." At 504, a determination is made as to whether or not the number or percentage of unavailable address and port pairs is exceeded. The percentage represents a configurable threshold to reassign address and port identifiers that generate redirected traffic. If not, at 506, no operation is performed. If so, at 508, a list of the address and ports that are available is mapped to a forwarder unit (forwarder device) in the cluster 110 for distribution to other devices in the cluster 110. At 510, a list of the address and ports is sent to the master device in the cluster 110. The address and port pairs are reassigned to other devices to achieve traffic optimization. Also, as shown in FIG. 5, at operation 512, a periodic timer for an address and port pair reassignment expires.

At 514, a determination is made as to whether there are any unavailable address and port pairs. If so, the process continues to operation 508. If not, at 516, the periodic timer is reset.

Figure 6:
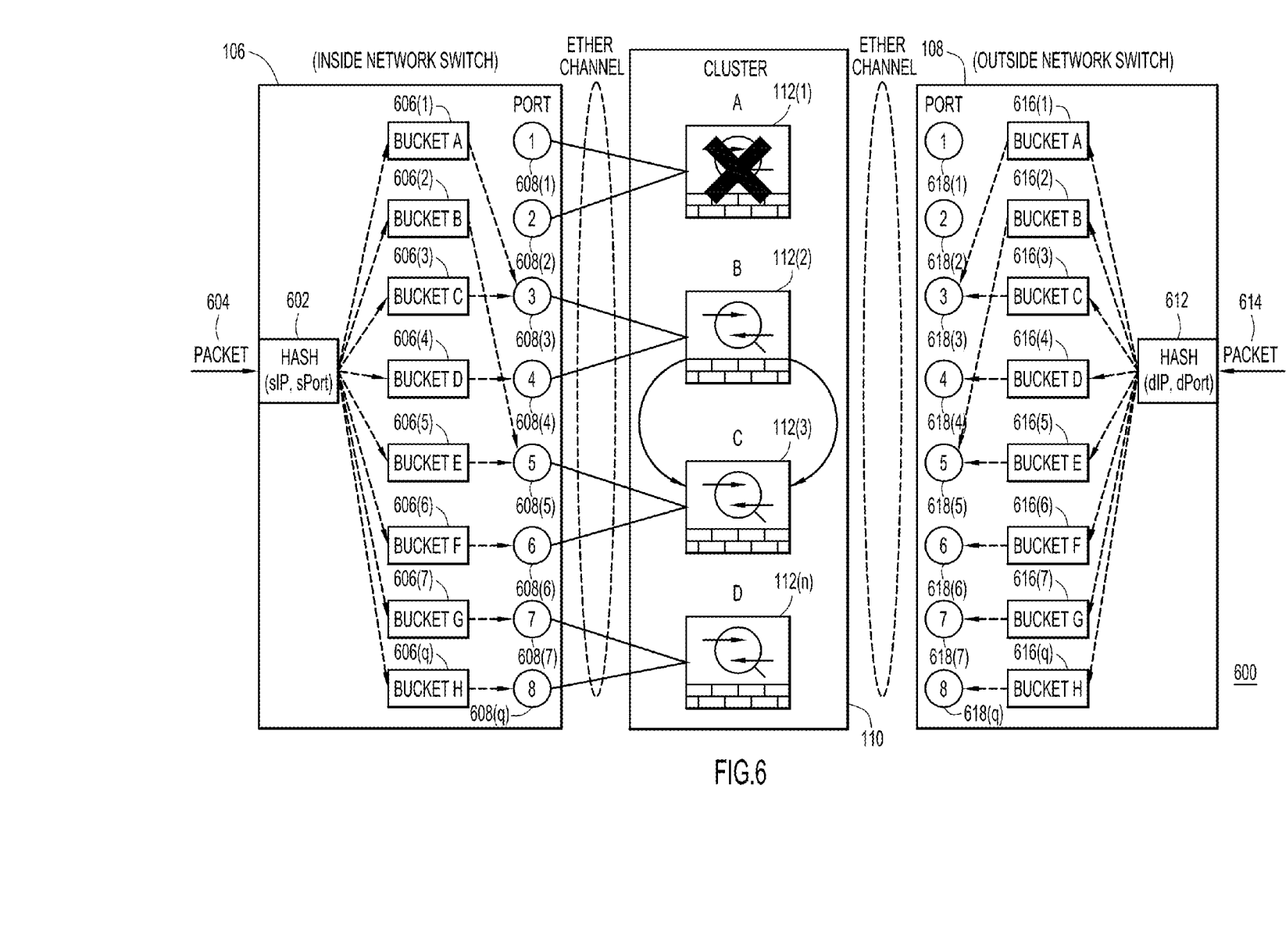
FIG. 6 shows an example topology depicting a failure event of a network device in the cluster.

Reference is now made to FIG. 6, which shows an example network 600 depicting a failure event of a device in the cluster 110. The network 600 of FIG. 6 includes the inside network switch 106 and the outside network switch 108. The inside network switch 106 has a hashing module 602, which hashes an incoming packet (shown at 604) such that the packet is sent to one of the devices in the cluster 110. The hashing module 602 hashes the source IP address and source port information of the packet and performs the hashing by assigning the packet to one or more bucket modules 606(1)-606(q) associated with ports 608(1)-608(q) of the inside network switch 106. The ports 608(1)-608(q) are coupled to one or more devices in the cluster 110. Likewise, the outside network switch has a hashing module 612, which hashes an incoming packet (shown at 614) such that the packet is sent to one of the devices in the cluster 110. The hashing module 612 hashes the destination IP address and the destination port information of the packet and performs the hashing by assigning the packet to one or more bucket modules 616(1)-616(q) associated with ports 618(1)-618(q) of the outside network switch 108.

FIG. 6 also shows a plurality of devices 112(1)-112(n) in the cluster 110. In FIG. 6, device 112(1) experiences a failure event. As device 112(1) experiences the failure (e.g., removal) event, device 112(3) takes over as a backup for device 112(1), and thus, packets that were originally hashed to device 112(1) are now received by device 112(2) and are redirected to the backup device 112(3). When device 112(1) comes back online, it downloads connection states from the other devices in the cluster 110 and obtains a mapping table to determine its ownership of the IP address and port identifier pairs of the packets. In general, the bucket modules in FIG. 6 are logical endpoints that can be redirected to physical ports. Hashing functions generate a result that can be mapped to a physical port. That way, changes in the number of available ports do not affect the hash result. Existing flows stay where they were if the physical port is not affected.

Figure 7:
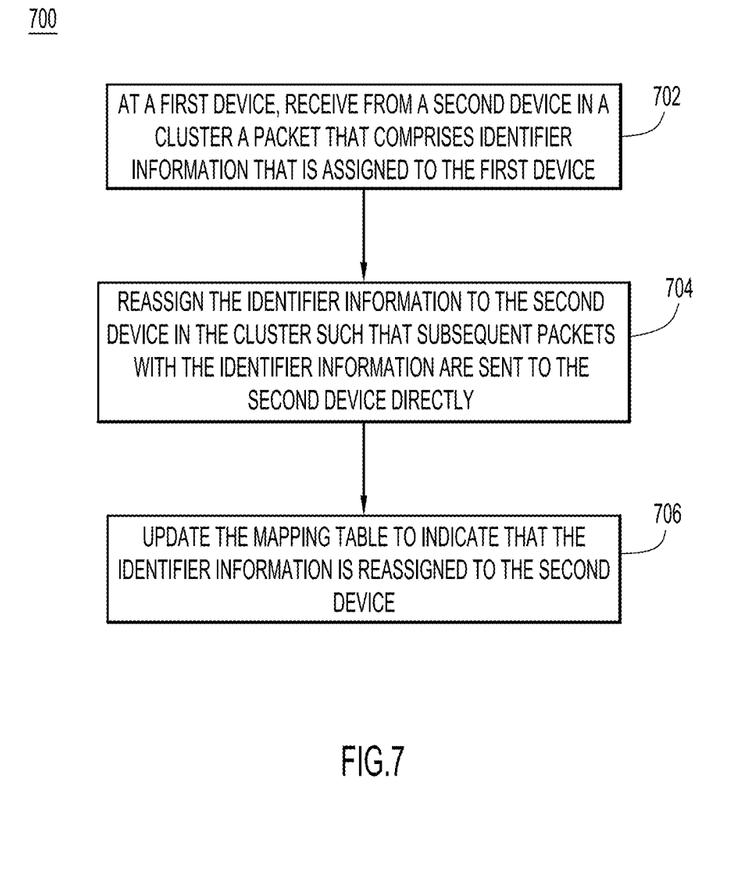
FIG. 7 shows an example flow chart depicting operations for a network device to map and forward packets to appropriate network devices in the cluster.

Reference is now made to FIG. 7. FIG. 7 shows a flow chart 700 depicting operations for a device in the cluster 110 configured to map and forward packets to appropriate devices in the cluster 110. At reference numeral 702, at a first device in a cluster of devices in a network, a packet is received from a second device. The packet comprises an identifier that is assigned to the first device. At 704, the identifier is reassigned to the second device in the cluster such that subsequent packets with the identifier are sent directly to the second device. At 706, a mapping table is updated to indicate that the identifier is reassigned to the second device.

Figure 8:
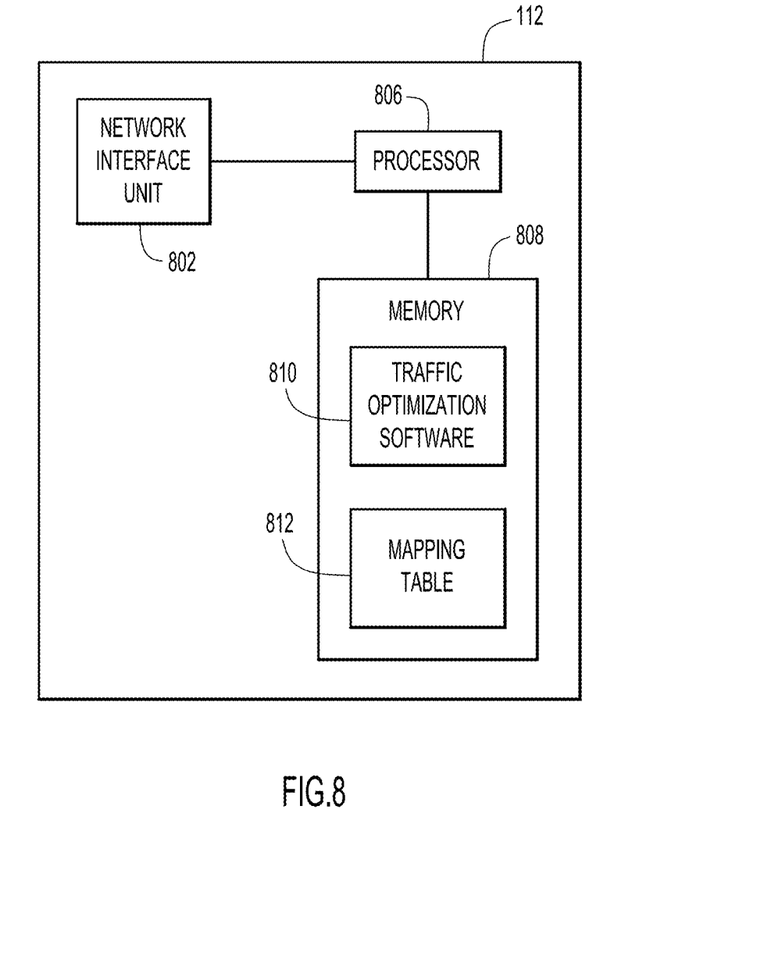
FIG. 8 shows an example block diagram of a network device in the cluster configured to optimize traffic routing in accordance with the techniques presented herein.

Reference is now made to FIG. 8, which shows an example block diagram of a device configured to optimize traffic routing. The device in FIG. 8 is shown generally at reference numeral 112, though it should be appreciated that the device 112 in FIG. 8 may represent any of the devices in the cluster 110. Device 112 comprises a network interface unit 802, a processor 806 and memory 808. The network interface unit 802 is configured to receive communications (e.g., packets, provisioning information, etc.) from devices in the network 100 and is configured to send communications to devices the network 100. The processor 806 is, for example, a microprocessor or microcontroller that is configured to execute program logic instructions (i.e., software) for carrying out various operations and tasks of the device 112, as described above. For example, the processor 806 is configured to execute traffic optimization software 810 to optimize traffic routing of packets within the cluster 110, as described herein.

The functions of the processor 806 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 808 may comprise read only memory (ROM), random access memory (RAM), magnetic disk storage media devices, optical storage media devices, flash memory devices, electrical, optical, or other physical/tangible (non-transitory) memory storage devices. The memory 808 stores software instructions for the traffic optimization software 810. The memory 808 also stores a mapping table 812, configured to store associations between identifier information (e.g., IP address and/or IP address and port pairs) and devices in the cluster 110. Thus, in general, the memory 808 may comprise one or more computer readable storage media (e.g., a memory storage device) encoded with software comprising computer executable instructions and when the software is executed (e.g., by the processor 806) it is operable to perform the operations described for the traffic optimization software 810.

The traffic optimization software 810 may take any of a variety of forms, so as to be encoded in one or more tangible computer readable memory media or storage device for execution, such as fixed logic or programmable logic (e.g., software/computer instructions executed by a processor), and the processor 806 may be an ASIC that comprises fixed digital logic, or a combination thereof.

For example, the processor 806 may be embodied by digital logic gates in a fixed or programmable digital logic integrated circuit, which digital logic gates are configured to perform the traffic optimization software 810. In general, the traffic optimization software 810 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the devices in the cluster 110 may be performed by one or more computer or machine readable storage media (non-transitory) or device executed by a processor and comprising software, hardware or a combination of software and hardware to perform the techniques described herein.

In summary, a method is provided comprising: at a first device in a cluster of devices in a network, receiving from a second device in the cluster a packet that comprises identifier information that is assigned to the first device; reassigning the identifier information to the second device in the cluster such that subsequent packets with the identifier information are sent to the second device directly; and updating a mapping table to indicate that the identifier information is reassigned to the second device.

Additionally, an apparatus is provided comprising: a network interface unit configured to enable communications over a network; and a processor coupled to the network interface unit, and configured to: receive from a device in the cluster a packet that comprises identifier information that is assigned to the apparatus; reassign the identifier information to the device in the cluster such that subsequent packets with the identifier information are sent directly to the device; and update a mapping table to indicate that the identifier information is reassigned to the device.

Furthermore, one or more computer readable storage media is provided that is encoded with software comprising computer executable instructions and when the software is executed operable to: receive from a second device in the cluster a packet that comprises identifier information that is assigned to a first device; reassign the identifier information to the second device in the cluster such that subsequent packets with the identifier information are sent directly to the second device; and update a mapping table to indicate that the identifier information is reassigned to the second device.

The above description is intended by way of example only. Various modifications and structural changes may be made therein without departing from the scope of the concepts described herein and within the scope and range of equivalents of the claims.

What is claimed is:

1. A method comprising:
    at a first device in a cluster of devices in a network, receiving from a second device in the cluster a packet that is designated to be directly received by the first device from a device outside the cluster but is redirected to the second device from the device outside the cluster, wherein the packet comprises identifier information that is assigned to the first device, and wherein the identifier information comprises a public address assigned to the first device;
    reassigning the identifier information to the second device in the cluster making the second device a master device in the cluster such that subsequent packets with the identifier information are directly received by the second device; and
    updating a mapping table to indicate that the identifier information is reassigned to the second device.

2. The method of claim 1, wherein the identifier information is an Internet Protocol address.

3. The method of claim 1, wherein the identifier information is a Media Access Control address.

4. The method of claim 1, wherein the identifier information is an Internet Protocol address and port pair.

5. The method of claim 1, further comprising sending the updated mapping table to all devices in the cluster.

6. The method of claim 5, wherein sending comprises sending the updated mapping table to all of the devices in the cluster to cause one or more devices in the cluster to send packets received with the identifier information to the second device.

7. The method of claim 1, wherein reassigning comprises reassigning the identifier information to the second device to minimize routing of subsequent packets with the identifier information between devices in the cluster.

8. The method of claim 1, wherein the identifier information includes translated identifier information that was previously translated by the first device.

9. The method of claim 1, wherein reassigning comprises reassigning the identifier information to the second device such that the second device becomes responsible for managing exchange of all packets with the identifier information.

10. The method of claim 1, wherein reassigning comprises reassigning the identifier information based on an exchange between the first device and a device outside of the cluster, wherein the exchange indicates that the identifier information should be reassigned to the second device in the cluster.

11. The method of claim 1, further comprising reassigning the identifier information to a third device in the cluster in response to a removal of the second device from the cluster.

12. The method of claim 1, further comprising at the second device, receiving from the first device a reassignment message that causes the second device to be associated with the identifier information.

13. An apparatus comprising:
a network interface unit configured to enable network communications; and
a processor coupled to the network interface unit, and configured to:
receive from a second device in a cluster of devices in a network, a packet that is designated to be directly received by the apparatus from a device outside the cluster but is redirected to the second device from the device outside the cluster, wherein the packet comprises identifier information that is assigned to the apparatus, and wherein the identifier information comprises a public address assigned to the apparatus;
reassign the identifier information to the second device in the cluster making the second device a master device in the cluster such that subsequent packets with the identifier information are directly received by the second device; and
update a mapping table to indicate that the identifier information is reassigned to the device.

14. The apparatus of claim 13, wherein the processor is further configured to send the updated mapping table to all devices in the cluster.

15. The apparatus of claim 14, wherein the processor is further configured to send the updated mapping table to all of the devices in the cluster to cause one or more devices in the cluster to send packets received with the identifier information to the second device.

16. The apparatus of claim 13, wherein the processor is further configured to reassign the identifier information to the second device to minimize routing of subsequent packets with the identifier information between devices in the cluster.

17. The apparatus of claim 13, wherein the identifier information includes translated identifier information that was previously translated by the first device.

18. The apparatus of claim 13, wherein the processor is further configured to reassign the identifier information to the second device such that the second device becomes responsible for managing exchange of all packets with the identifier information.

19. The apparatus of claim 13, wherein the processor is further configured to reassign the identifier information to a third device in the cluster in response to a removal of the second device from the cluster.

20. One or more non-transitory computer readable storage media encoded with software comprising computer executable instructions and when the software is executed operable to:
receive from a second device in a cluster of devices in a network a packet that is designated to be directly received by a first device from a device outside the cluster but is redirected to the second device from the device outside the cluster, wherein the packet comprises identifier information that is assigned to the first device, and wherein the identifier information comprises a public address assigned to the first device;
reassign the identifier information to the second device in the cluster making the second device a master device in the cluster such that subsequent packets with the identifier information are directly received by the second device; and
update a mapping table to indicate that the identifier information is reassigned to the second device.

21. The non-transitory computer readable storage media of claim 20, further comprising instructions operable to send the updated mapping table to all devices in the cluster.

22. The non-transitory computer readable storage media of claim 21, wherein the instructions operable to send comprise instructions operable to send the updated mapping table to all of the devices in the cluster to cause one or more devices in the cluster to send packets received with the identifier information to the second device.

23. The non-transitory computer readable storage media of claim 20, further comprising instructions operable to reassign the identifier information to the second device such that the second device becomes responsible for managing exchange of all packets with the identifier information.

24. The non-transitory computer readable storage media of claim 20, further comprising instructions operable to reassign the identifier information to a third device in the cluster in response to a removal of the second device from the cluster.

* * * * *